United States Patent
Ramesh et al.

(10) Patent No.: US 12,487,836 B2
(45) Date of Patent: Dec. 2, 2025

(54) SYSTEMS AND METHODS FOR AUTOMATICALLY GENERATING AND APPLYING SELECTED CONDITIONS TO PROCESS DATA

(71) Applicant: The Toronto-Dominion Bank, Toronto (CA)

(72) Inventors: Maitreyi Swaroop Ramesh, Toronto (CA); Christopher William Kelly, Waterdown (CA); Gregory Suvajac, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 139 days.

(21) Appl. No.: 18/499,644

(22) Filed: Nov. 1, 2023

(65) Prior Publication Data

US 2025/0138838 A1    May 1, 2025

(51) Int. Cl.
    G06F 9/44    (2018.01)
    G06F 9/445   (2018.01)

(52) U.S. Cl.
    CPC ................. G06F 9/44505 (2013.01)

(58) Field of Classification Search
    CPC ............. G06F 1/32; G06F 9/44; G06F 1/12
    See application file for complete search history.

(56) References Cited

U.S. PATENT DOCUMENTS

| | | | |
|---|---|---|---|
| 7,343,364 B2 | 3/2008 | Bram | |
| 7,937,319 B2 | 5/2011 | Kennis | |
| 8,296,732 B2 * | 10/2012 | Fraley | G06F 9/44505 |
| | | | 717/124 |
| 10,261,892 B2 * | 4/2019 | Patel | G06F 11/3692 |
| 10,510,055 B2 | 12/2019 | Desai | |
| 10,558,471 B2 | 2/2020 | Pasirstein | |
| 11,068,468 B2 | 7/2021 | Pasini | |
| 11,196,627 B1 | 12/2021 | Khoo | |
| 11,475,321 B2 | 10/2022 | Rangarajan | |

(Continued)

FOREIGN PATENT DOCUMENTS

WO    2023037325 A3    4/2023

OTHER PUBLICATIONS

Rouf, Yar Akhter, "A Hierarchical Rule-Based Security Management System for Date-Intensive Applications", Thesis, Sep. 2018, retrieved from <https://yorkspace.library.yorku.ca/items/5d6a0c56-a6e0-4ba9-b032-a5053b363cf1>.

*Primary Examiner* — Keshab R Pandey
(74) *Attorney, Agent, or Firm* — Marks & Clerk; Wilfred P. So

(57) ABSTRACT

Systems and methods for automatically generating and applying selected conditions to process data are provided. A system receives an application request, which includes one or more fields and one or more corresponding data items. The application request may originate from an artificial intelligence system executing a machine learning model. The system also receives a configuration file from a configuration repository and processes the same to identify a plurality of rules. For each selected rule of the plurality of rules applicable to selected fields the one or more fields, the system evaluates the selected rules against selected data items associated with the selected fields. Based on the evaluating, the system determines a result of the application request and transmits the result for display.

18 Claims, 11 Drawing Sheets

(56) References Cited

U.S. PATENT DOCUMENTS

| | | |
|---|---|---|
| 11,614,951 B2 | 3/2023 | Shrivastava |
| 12,164,542 B1 | 12/2024 | Rahman |
| 2010/0257539 A1 | 10/2010 | Narayanan |
| 2014/0281893 A1* | 9/2014 | Borland ............... H04L 67/535 |
| | | 715/234 |
| 2018/0293681 A1 | 10/2018 | Larowe |
| 2022/0245044 A1* | 8/2022 | Mabry .................. G06N 5/025 |
| 2025/0028852 A1 | 1/2025 | Chowanski |
| 2025/0030547 A1 | 1/2025 | Chowanski |
| 2025/0068646 A1 | 2/2025 | Rahman |
| 2025/0077939 A1 | 3/2025 | Tabatabaei |
| 2025/0086151 A1 | 3/2025 | Arora |
| 2025/0104700 A1 | 3/2025 | Henault-Ethier |

* cited by examiner

SYSTEMS AND METHODS FOR AUTOMATICALLY GENERATING AND APPLYING SELECTED CONDITIONS TO PROCESS DATA

TECHNICAL FIELD

The disclosed exemplary embodiments relate to computer-implemented systems and methods for automatically generating and applying conditions to process data.

BACKGROUND

A centralized software application may be updated on a frequent basis. Specifically, conditional logic within the software application may be updated. Previous and existing approaches include updating blocks of code in the software application during scheduled downtime, e.g., at night, when there are no users logged into or using the software application. Updating code of the software application would, in many cases, involve testing the software application both before and afterwards. This approach, also sometimes called a "deployment", is prone to introducing new or additional error conditions, such as software bugs or regressions. Furthermore, conditional logic generally is hardcoded as static if-then-else statements. These hardcoded and static conditions can make tracking the logic in the software application difficult.

These software application maintenance challenges are made more difficult when the conditional logic is updated frequently. For example, users use software applications for inputting and assessing certain criteria. In some cases, the conditional logic used to compute the assessments may be modified on an ad hoc basis, without advance notice to users. In some cases, the conditional logic may even be modified on a daily basis. Updating the software code in a centralized manner can be very difficult for computing environments, including those with many users, and users may lose track of these modifications.

SUMMARY

The following summary is intended to introduce the reader to various aspects of the detailed description, but not to define or delimit any invention.

In at least one broad aspect, there is provided a system for generating automatically selected conditions, comprising: a memory storing instructions; and a first processor coupled to the memory. The first processor is configured to execute the instructions to: receive an application request, the application request comprising one or more fields and one or more data items corresponding respectively to each of the one or more fields; retrieve a configuration file from a configuration repository: process the configuration file to identify a plurality of rules; for each selected rule of the plurality of rules applicable to selected fields of the one or more fields, evaluate the selected rules against selected data items associated with the selected fields; based on the evaluating, determine a result of the application request; and transmit the result for display.

In some cases, the plurality of rules comprises one or more static rules.

In some cases, the plurality of rules comprises one or more dynamic rules, wherein each dynamic rule comprises at least a first conditional rule and a second conditional rule, wherein a first condition of the first conditional rule overlaps with a second condition of the second conditional rule.

In some cases, the first processor is further configured to, for each dynamic rule, evaluate the first conditional rule and, based on detecting the first conditional rule is satisfied, continue to evaluate the second conditional rule.

In some cases, a plurality of previous versions of the configuration file have been retrieved periodically from the configuration repository prior to retrieving the configuration file, and wherein the configuration file is a most recent version retrieved from the configuration repository.

In some cases, the result is displayed in a web-based interface provided by the first processor.

In some cases, the system further comprises a second processor operatively coupled to the first processor, wherein the second processor is configured to receive the result, and to provide a web-based interface for displaying the result.

In some cases, the configuration file comprises the plurality of rules, and each one of the plurality of rules comprises a start date and an end date defining a time period of applicability for a corresponding one of the plurality of rules.

In some cases, a first given rule of the plurality of rules comprises a first corresponding start date and a first corresponding end date defining a first time period of applicability of the first given rule, a second given rule of the plurality of rules comprises a second corresponding start date and a second corresponding end date defining a second time period of applicability of the second given rule, and the first time period of applicability is different from the second time period of applicability.

In some cases, the each one of the plurality of rules further comprises a condition name, one or more controls, and a rule result; and wherein, if the one or more controls are satisfied based on the selected fields, the rule result is processed in determining the result of the application request.

In at least another broad aspect, a method is provided for generating automatically selected conditions. The method is executed in a computing environment comprising one or more processors and memory, and the method comprises: receiving an application request, the application request comprising one or more fields and one or more data items corresponding respectively to each of the one or more fields; retrieving a configuration file from a configuration repository; processing the configuration file to identify a plurality of rules; for each selected rule of the plurality of rules applicable to selected fields of the one or more fields, evaluating the selected rules against selected data items associated with the selected fields; based on the evaluating, determining a result of the application request; and transmitting the result for display.

In some cases, the plurality of rules comprises one or more static rules.

In some cases, the plurality of rules comprises one or more dynamic rules, wherein each dynamic rule comprises at least a first conditional rule and a second conditional rule, wherein a first condition of the first conditional rule overlaps with a second condition of the second conditional rule.

In some cases, the method further comprises: for each dynamic rule, evaluating the first conditional rule and, based on detecting the first conditional rule is satisfied, continuing to evaluate the second conditional rule.

In some cases, a plurality of previous versions of the configuration file have been retrieved periodically from the configuration repository prior to retrieving the configuration file, and wherein the configuration file is a most recent version retrieved from the configuration repository.

In some cases, the method is executed using a first processor in the computing environment, and the method further comprising using a second processor operatively coupled to the first processor to receive the result, and to provide a web-based interface for displaying the result.

In some cases, the configuration file comprises the plurality of rules, and each one of the plurality of rules comprises a start date and an end date defining a time period of applicability for a corresponding one of the plurality of rules.

In some cases, a first given rule of the plurality of rules comprises a first corresponding start date and a first corresponding end date defining a first time period of applicability of the first given rule, a second given rule of the plurality of rules comprises a second corresponding start date and a second corresponding end date defining a second time period of applicability of the second given rule, and the first time period of applicability is different from the second time period of applicability.

In some cases, the each one of the plurality of rules further comprises a condition name, one or more controls, and a rule result; and wherein, if the one or more controls are satisfied based on the selected fields, the method further comprises processing the rule result to determine the result of the application request.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

The drawings included herewith are for illustrating various examples of articles, methods, and systems of the present specification and are not intended to limit the scope of what is taught in any way. In the drawings.

DETAILED DESCRIPTION

In some cases, a software application is provided that obtains a configuration file to dynamically update the conditions within the software application without modifying the code of the application. In some cases, the software application is a centralized application that is web-based and can be accessed by client devices via a web-based interface associated with the software application. In some cases, the configuration file specifies a start date and an end date of a given rule, a rule name, one or more conditions associated with the rule, and a result that is returned based on determining the one or more conditions are satisfied. The configuration file is processed by the software application's memory and converted into one or more rules (also herein called a rule set), subject to determining if a current date falls within a time period of applicability defined by the start date and the end date of the given rule. In some cases, the configuration file is a Java Script Object Notation (JSON) file. In some other case, other data formats are used to implement the configuration file.

Figure 1A:
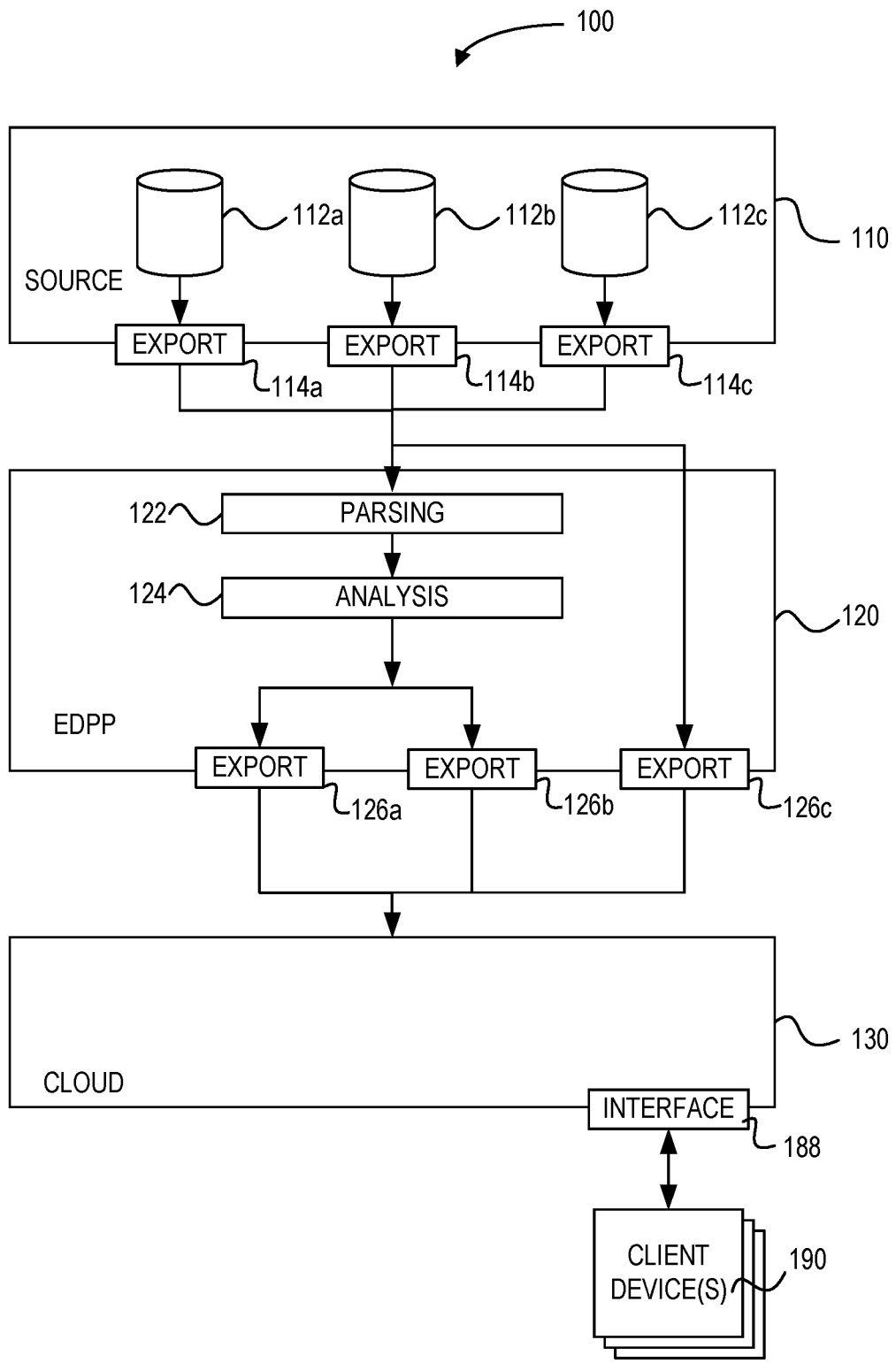
FIG. 1A is a schematic block diagram of a system for processing application requests in accordance with at least some embodiments.

Referring now to FIG. 1A, there is illustrated a block diagram of an example computing system, in accordance with at least some embodiments. Computing system 100 has a source database system 110, an enterprise data provisioning platform (EDPP) 120 operatively coupled to the source database system 110, and a cloud-based computing cluster 130 that is operatively coupled to the EDPP 120. In some cases. this computing system 100 is provided for automated data processing of large data sets, including computing a time series of predicted characteristics of assets identified within the large data sets.

Source database system 110 has one or more databases, of which three are shown for illustrative purposes: database 112a, database 112b and database 112c. One or more the databases of the source database system 110 may contain confidential information that is subject to restrictions on export. One or more export modules 114a, 114b, 114c may periodically (e.g., daily, weekly, monthly, etc.) export data from the databases 112a, 112b, 112c to EDPP 120. In some instances, the data is exported on an ad hoc basis. In some cases, the export data may be exported in the form of comma separated value (CSV) data, however other formats may also be used.

EDPP 120 receives source data exported by the export modules 114 of source database system 110, processes it and exports the processed data to an application database within the cloud-based computing cluster 130. For example, a parsing module 122 of EDPP 120 may perform extract, transform and load (ETL) operations on the received source data.

In many environments, access to the EDPP may be restricted to relatively few users, such as administrative users. However, with appropriate access permissions, data relevant to an application or group of applications (e.g., a client application) may be exported via reporting and analysis module 124 or an export module 126. In particular, parsed data can then be processed and transmitted to the cloud-based computing cluster 130 by a reporting and analysis module 124. Alternatively, one or more export modules 126a, 126b, 126c can export the parsed data to the cloud-based computing cluster 130.

In some cases, there may be confidentiality and privacy restrictions imposed by governmental, regulatory, or other entities on the use or distribution of the source data. These restrictions may prohibit confidential data from being transmitted to computing systems that are not "on-premises" or within the exclusive control of an organization, for example, or that are shared among multiple organizations, as is common in a cloud-based environment. In particular, such privacy restrictions may prohibit the confidential data from being transmitted to distributed or cloud-based computing systems, where it can be processed by machine learning systems, without appropriate anonymization or obfuscation of personal identifiable information (PII) in the confidential data. Moreover, such "on-premises" systems typically are designed with access controls to limit access to the data, and thus may not be resourced or otherwise suitable for use in broader dissemination of the data. In some cases, to comply with such restrictions, one or more module of EDPP 120 may "de-risk" data tables that contain confidential data prior to transmission to cloud-based computing cluster 130. In some cases, this de-risking process may obfuscate or mask elements of confidential data, or may exclude certain elements, depending on the specific restrictions applicable to the confidential data. The specific type of obfuscation, masking or other processing is referred to as a "data treatment."

The cloud-based computing cluster 130 includes an interface 188, which facilitates data communication with one or more client devices.

Figure 1B:
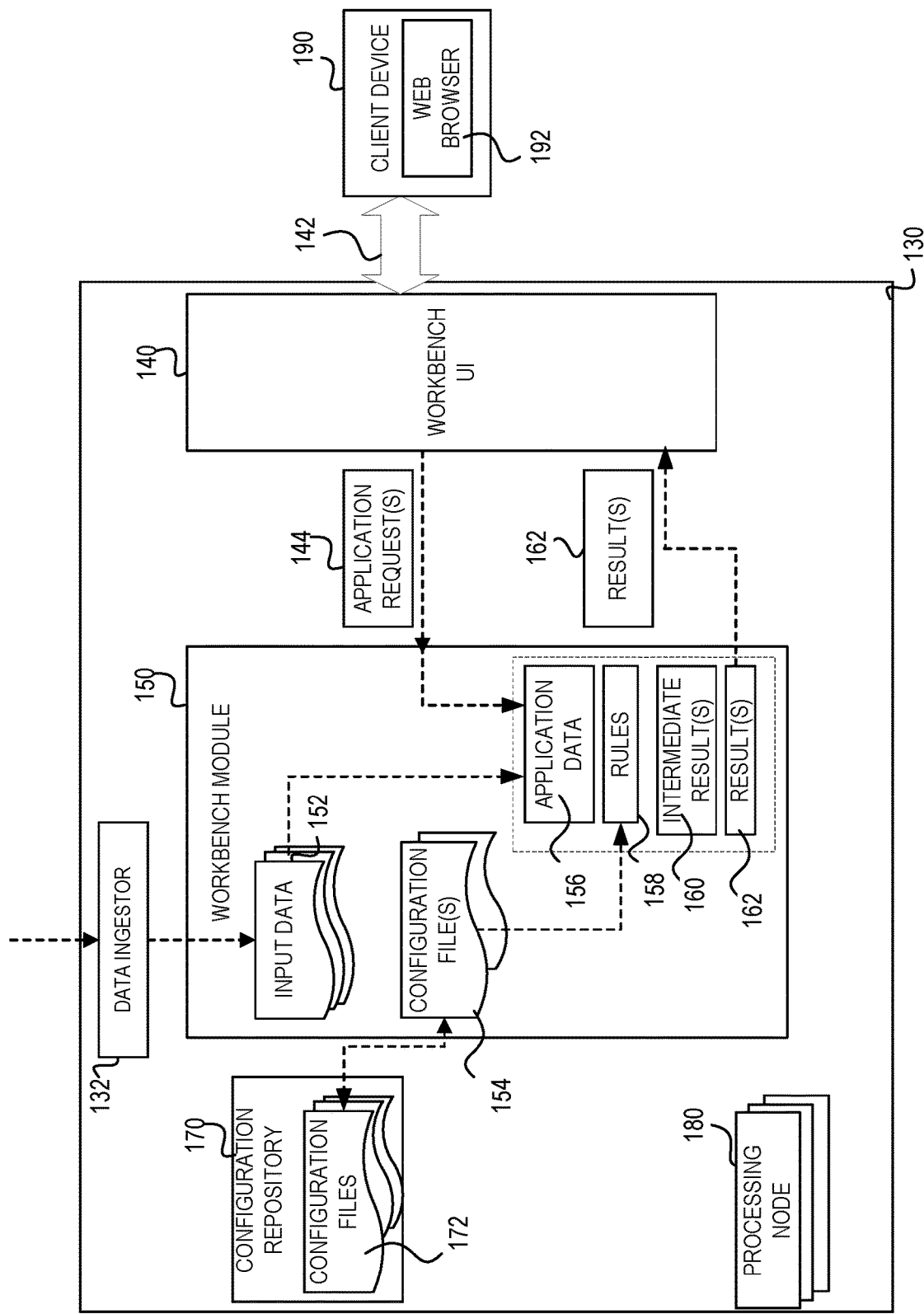
FIG. 1B is a schematic block diagram of a cloud-based computing cluster of FIG. 1A, including a workbench module configured to automatically generate and apply selected conditions to process data, in accordance with at least some embodiments.

Referring now to FIG. 1B, there is illustrated a block diagram of the cloud-based computing cluster 130, showing greater detail of the elements of the cloud-based computing cluster, which may be implemented by computing nodes of the cluster that are operatively coupled.

The components of the cloud-based computing cluster 130 include a data ingestor 132, a workbench module 150, a workbench user interface (UI) 140, and a configuration repository 170. In some cases, the data ingestor 132, the workbench module 150, the workbench UI 140, and the configuration repository 170 are implemented as one or more processing nodes 180 in the cloud-based computing cluster. In some cases, these components are implemented as virtual machines within the cloud-based computing cluster.

The workbench module 150 obtains an application request 144, in some cases from the workbench UI 140. In some cases, the workbench UI 140 sends the application requests 144 to the workbench module.

The application request 144 includes one or more fields and one or more data items corresponding respectively to each of the one or more fields. In some cases, the one or more field and the one or more data items are organized as application data 156. In some cases, the application data also includes input data 152 obtained by the data ingestor 132. In other words, in some cases, the application data in an application request that is initially provided by the workbench UI 144 could be modified or supplemented by other data, forming an updated set of application data of the same application request.

The workbench module 150 is also configured to retrieve a configuration file 154 from a configuration repository 170. The configuration repository 170 stores one or more configuration files 172. In some cases, the configurations files 172 stored in the configuration repository 170 are added to the configuration repository or modified by a developer (i.e., a person) or are added to the configuration repository or modified automatically using software. In particular, at least one of the configuration files 172 stored in the configuration repository 170 is retrieved by the workbench module 150 and locally stored thereon as the at least one configuration file 154.

In some cases, the workbench module periodically retrieves the configuration file from the configuration repository to ensure it has the most recent version local stored on the workbench module. In other words, previous versions of the configuration file have been retrieved periodically by the workbench module prior to retrieving the configuration file, which is a most recent version retrieved from the configuration repository.

The workbench module 150 is also configured to process the configuration file 154 to identify a plurality of rules 158. In some cases, selected rules from amongst the plurality of rules are applicable to selected fields from amongst the one or more fields in the application request or application data, or both. For example, the selected rules specify one or more conditions that are used to determine the selected fields from amongst the one or more fields.

The workbench module 150 is configured to, for each selected rule of the plurality of rules applicable to selected fields of the one or more fields, evaluate the selected rules against selected data items associated with the selected fields. Based on the evaluating, the workbench module 150 determines a result 162 of the application request.

In some cases, evaluating each selected rule outputs an intermediary result, and a set of intermediate results 160 from evaluating a set of selected rules is used to determine the result 162 of the application request. In some cases, the each of the intermediate results 162 is a score corresponding to a selected rule, and the collective scores of the set of intermediate results 160 is used to compute the result 162 of the application request.

The workbench module 150 is also configured to transmit the result 162 of the application request for display.

In some cases, a client device 190 uses its web browser 192 to connect to the workbench UI 140 over a data network connection 142, such as an Internet connection. The client device 190, via the web browser 192, interacts with the workbench UI 140 to invoke generating and sending the application request 144 to the workbench module 150. In some cases, the result 162 computed by the workbench module 150 is transmitted to the workbench UI 140 and the workbench UI displays the result for viewing by on the web browser 192 running on the client device 190.

In some cases, the workbench UI 140 is a web-based interface and the workbench UI 140 and the workbench module 150 are executed on a same processing node 180. In some cases, the result is displayed in the web-based interface provided by the same processor used to execute the workbench module.

In some other cases, the workbench module 150 is executed on a first processor node and the workbench UI 140 is a web-based interface that is executed on a second processor node that is operatively coupled to the first processor node, wherein the second processor node is configured to receive the result 162 and provides the web-based interface for displaying the result.

In some cases, multiple client devices 190 connect to the workbench UI 140 to submit application requests. The workbench module 150 processes the multiple application requests corresponding to the multiple client devices and returns multiple results corresponding to the multiple application requests.

In some cases, a first application request from a first client device invokes a first set of selected rules, from amongst the plurality of rules from the configuration file, that are applicable to a first set of selected fields from the first application request. In some cases, a second application request from a second client device invokes a second set of selected rules, from amongst the plurality of rules from the configuration file, that are applicable to a second set of selected fields from the second application request. The second set of rules and the second set of selected fields are different from the first set of rules and the first set of selected fields.

It will be appreciated that, while the components shown in FIG. 1B for the cloud-based computing cluster 130 can be implemented with the system 100 in FIG. 1A, in some other cases, the components shown in FIG. 1B are instead implemented in an isolated computing server system. In other words, the components shown in FIG. 1B can be implemented as a processing node 180 without the EDPP 120 and the source database system 110.

Figure 2:
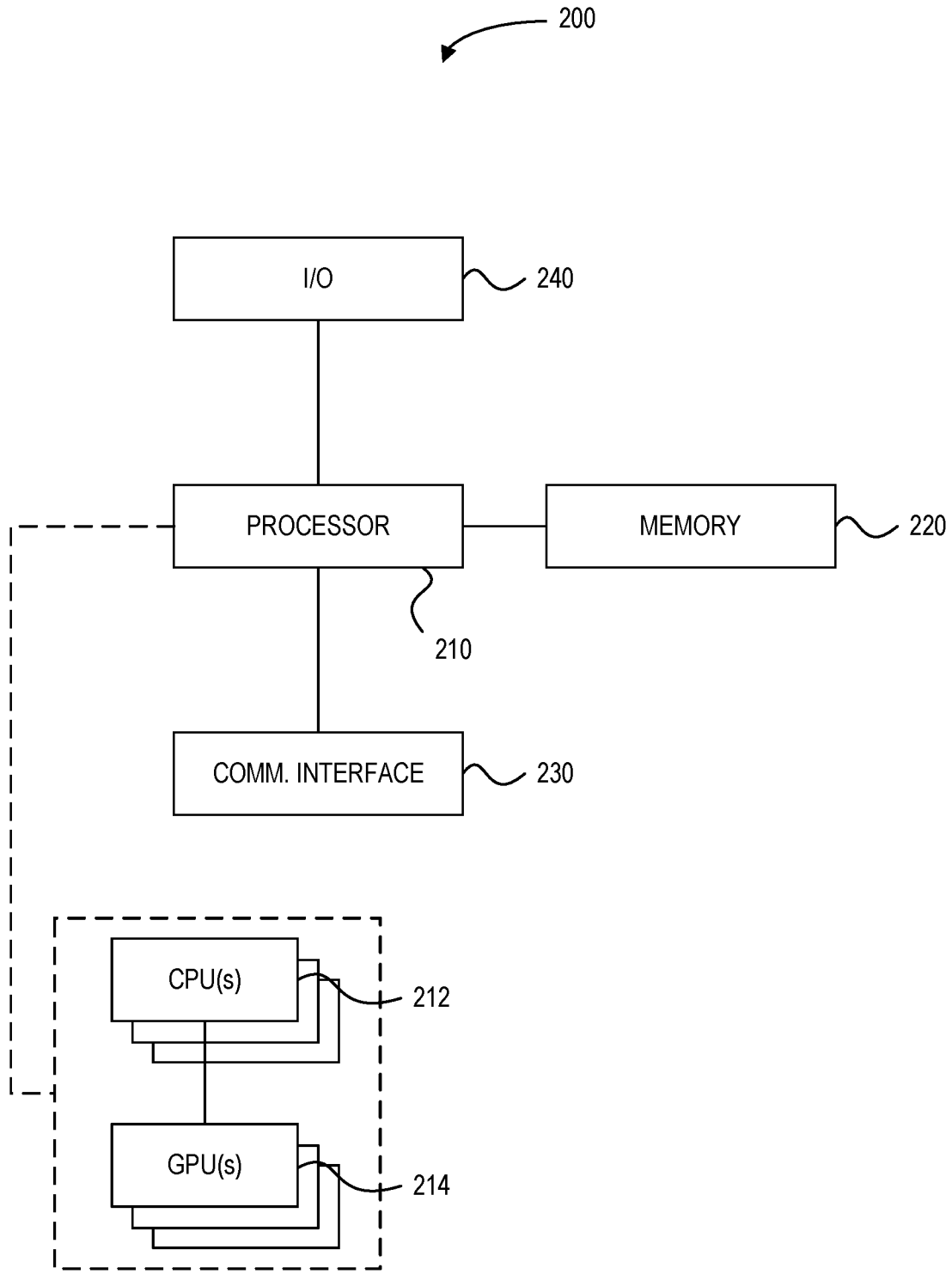
FIG. 2 is a block diagram of a computer in accordance with at least some embodiments.

Referring now to FIG. 2, there is illustrated a simplified block diagram of a computer in accordance with at least some embodiments. Computer 200 is an example implementation of a computer such as source database system 110, EDPP 120, processing node 180 of FIG. 1A. Computer 200 has at least one processor 210 operatively coupled to at least one memory 220, at least one communications interface 230 (also herein called a network interface), and at least one input/output device 240.

The at least one memory 220 includes a volatile memory that stores instructions executed or executable by processor 210, and input and output data used or generated during execution of the instructions. Memory 220 may also include non-volatile memory used to store input and/or output data—e.g., within a database—along with program code containing executable instructions.

Processor 210 may transmit or receive data via communications interface 230, and may also transmit or receive data via any additional input/output device 240 as appropriate.

In some cases, the processor 210 includes a system of central processing units (CPUs) 212. In some other cases, the processor includes a system of one or more CPUs and one or more Graphical Processing Units (GPUs) 214 that are coupled together. For example, the prediction processor 166 executes machine learning computations on CPU and GPU hardware, such as the system of CPUs 212 and GPUs 214.

Figure 3:
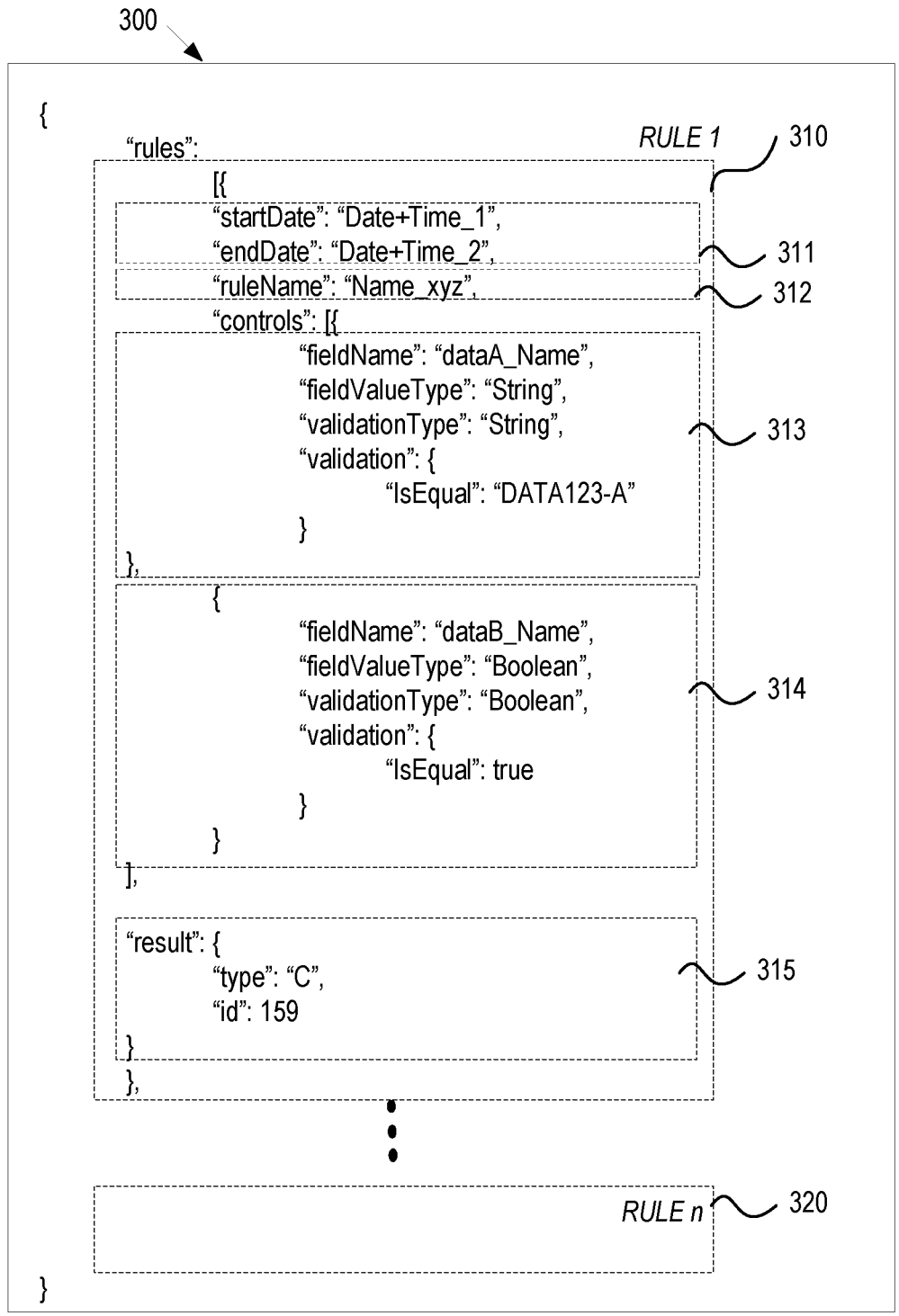
FIG. 3 is a schematic block diagram of a configuration file in accordance with at least some embodiments.

Referring now to FIG. 3, an example of a configuration file 300 is provided, which is stored on the configuration repository 170 and is available to be retrieved by the workbench module 150.

The configuration file 300 includes a plurality of rules and, in this case, a first rule 310 and an $n^{th}$ rule 320.

In some cases, each rule in the configuration file includes a start date and an end date 311, a rule identifier 312 (e.g., a rule name or some other identifying data), one more controls 313, 314, and a rule result 315. In some cases, based on determining that the one or more controls are satisfied based on the selected fields, the rule result is processed in determining the result of the application request. In some cases, the rule result is a score, and the collective of scores from the collective of the selected rules are considered to determine the result of the application request.

In some cases, the start date and the end date 311 define a time period of applicability for a corresponding one of the plurality of rules. In some cases, different rules have different time periods of applicability. This allows a given rule to be stored in a configuration file and loaded into memory on the workbench module, and automatically activated and deactivated respectively according to a given start date and a given end date of the given rule.

In some embodiments, a first given rule of the plurality of rules comprises a first corresponding start date and a first corresponding end date defining a first time period of applicability of the first given rule, and a second given rule of the plurality of rules comprises a second corresponding start date and a second corresponding end date defining a second time period of applicability of the second given rule. The first time period of applicability is different from the second time period of applicability.

In the example embodiment shown in FIG. 3, a first given control 313 defines a field name as "dataA_Name" and field type as "String". If a selected field from the application request has a matching field name (e.g., "dataA_Name") and has a corresponding data item equal to "DATA123-A", which is a validation condition in the first given control, then the first given control is determined to be satisfied. A second given control 314 defines a field name as "dataB_Name" and a field type as "Boolean". If another selected field from the application request has a matching field name (e.g., "dataB_Name") and has a corresponding data item equal to "true", which is a validation condition in the second given control, then the second given control is determined to be satisfied. If both the first given control and the second given control are satisfied, then the rule result 315 is returned. In some cases, such as in the embodiment shown in FIG. 4, the rule result 315 includes a rule result type and a rule result value. For example, the rule result value is an ID "159", which is a numeric score.

In some cases, other types of validation conditions are used which are different from "IsEqual". For example, greater than and less than logic may be used, as well as other types of logic. While the example in the first rule 310 includes two given controls 313 and 314, in some other embodiments, the number of controls can include one control, or can include more than two controls.

In some cases, the configuration file 300 is a JSON file.

Figure 4:
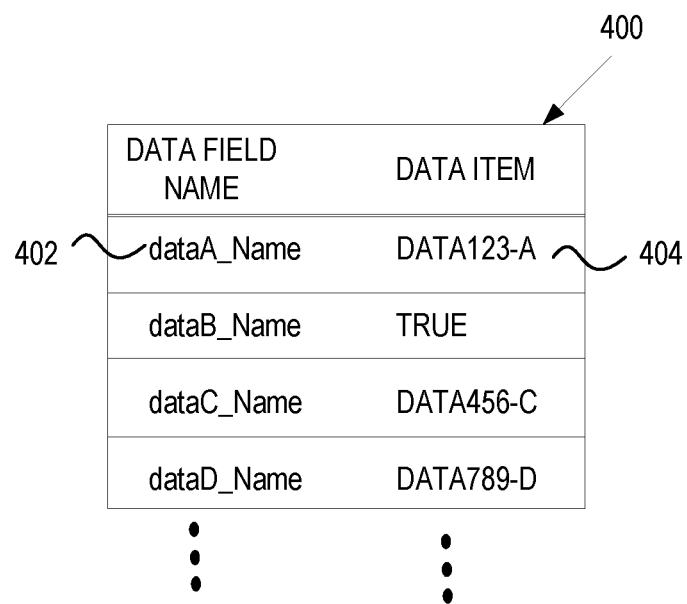
FIG. 4 is a schematic block diagram of data components of an application request in accordance with at least some embodiments.

Referring now to FIG. 4, an example embodiment of application data 400 from a given application request is shown, including data field names and at least one corresponding data item for each data field name. For example, a given data field name "dataA_Name" 402 includes a data item "DATA123-A" 404.

Figure 5:
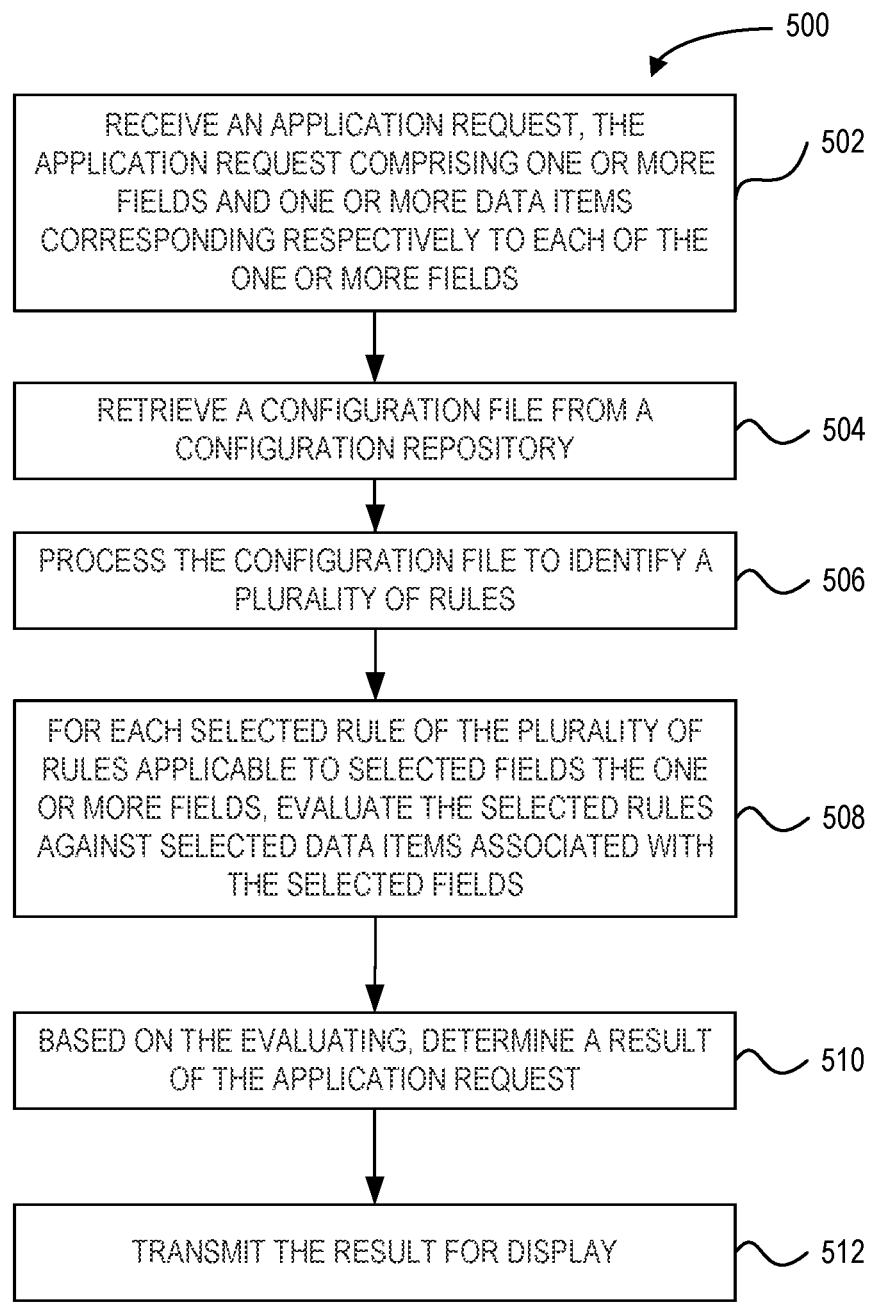
FIG. 5 is a flowchart diagram of an example method of automatically generating and applying selected conditions to process data in accordance with at least some embodiments.

Referring to FIG. 5, an example method 500 is provided, which is executable by a processor, such as a processor for a processing node that operates the workbench module. The method includes the following operations.

Block 502: Receive an application request, the application request comprising one or more fields and one or more data items corresponding respectively to each of the one or more fields.

Block 504: Retrieve a configuration file from a configuration repository.

Block 506: Process the configuration file to identify a plurality of rules

Block 508: For each selected rule of the plurality of rules applicable to selected fields the one or more fields, evaluate the selected rules against selected data items associated with the selected fields.

Block 510: Based on the evaluating, determine a result of the application request.

Block 512: Transmit the result for display.

In some cases, there are two types of rules. One type of rule is a static rule, and the other type of rule is a dynamic rule. A static rule includes one or more controls that, after determining they are each satisfied, provides a rule result. A dynamic rule includes at least a first conditional rule and a second conditional rule, wherein a first condition of the first conditional rule is required to be determined to be satisfied, and based on determining the first conditional rule is satisfied, this invokes evaluating whether the second conditional rule is satisfied. In some case, the first condition overlaps with a second condition of the second conditional rule.

Figure 6:
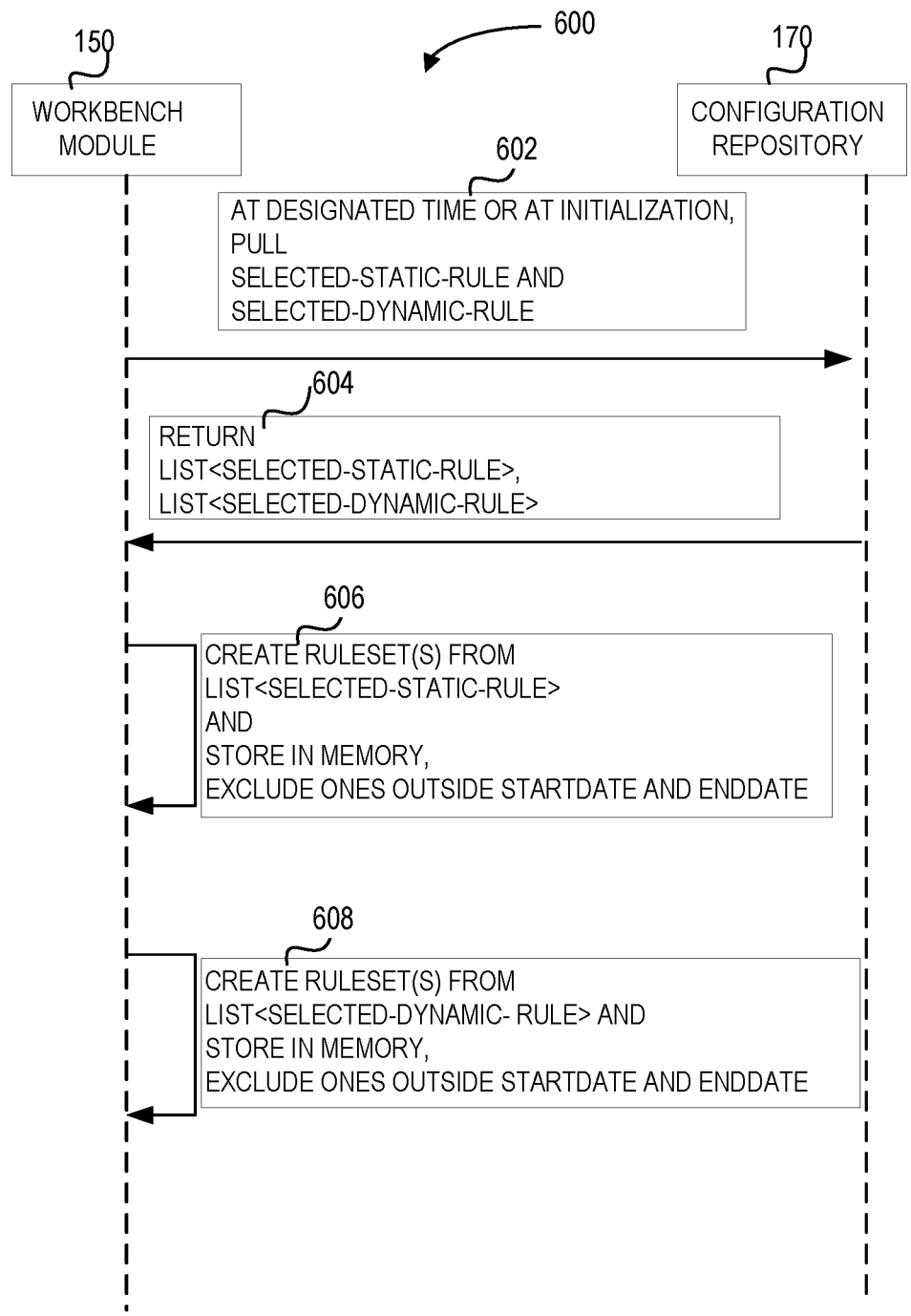
FIG. 6 is a flowchart diagram of an example method executed by a workbench module and a configuration repository retrieving a configuration file and using the configuration file to generate one or more rules in accordance with at least some embodiments.

Referring now to FIG. 6, an example method 600 is provided for a workbench module to locally generate a plurality of rules using a configuration file.

At block 602, at a designated time or at an initialization of the workbench module 150, the workbench module initiates a pull of for selected static rules and selected dynamic rules. In some cases, the designated time is based on a periodic daily time (e.g., 12:30 AM every day) to maintain the workbench module 150 with the most recent version of a configuration file.

In some case, the selected static rules and the selected dynamic rules are automatically selected and automatically applied, in some cases by default, to a given application request.

At block 604, in response to receiving the pull, the configuration repository 170 returns a configuration file with a list of selected static rules and a list of dynamic rules.

At block 606, the workbench module creates a plurality of static rules from the list of selected static rules from the configuration file and stores this plurality of static rules in its memory. In some cases, the plurality of static rules is stored in a memory cache of the workbench module for quick retrieval and processing. In some cases, based on determining that a current date is outside a given static rule's start date and end date, then the given static rule is excluded from being added to the plurality of rules that are stored in memory.

Similarly, at block 608, the workbench module creates a plurality of dynamic rules from the list of selected dynamic rules from the configuration file and stores this plurality of dynamic rules in its memory. In some cases, the plurality of dynamic rules is stored in a memory cache of the workbench module for quick retrieval and processing. In some cases, based on determining that a current date is outside a given dynamic rule's start date and end date, then the given dynamic rule is excluded from being added to the plurality of rules that are stored in memory.

Figure 7:
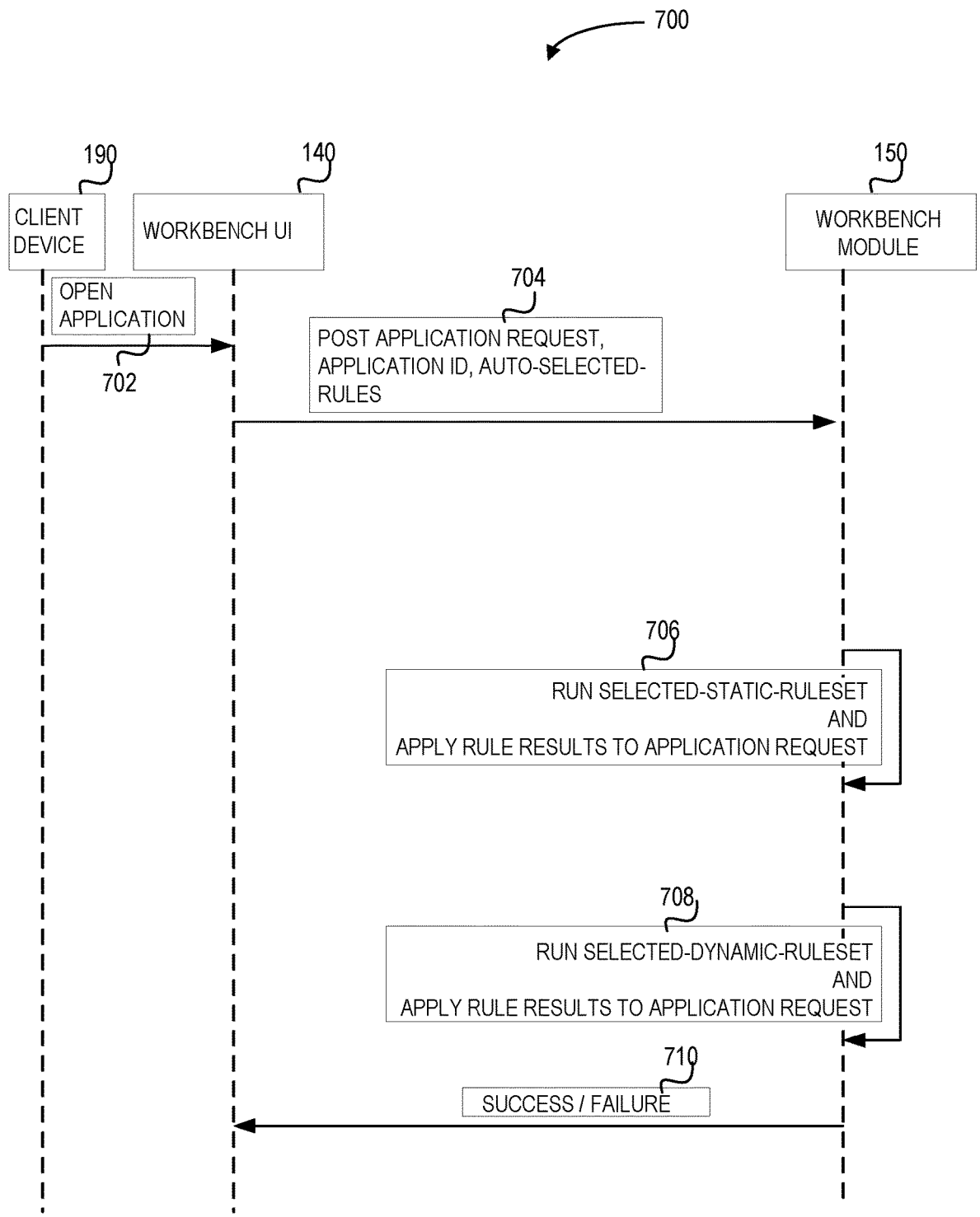
FIG. 7 is a flowchart diagram of an example method executed by a workbench user interface (UI) and the workbench module to apply the one or more rules to evaluate an application request, in accordance with at least some embodiments.

Referring now to FIG. 7, a method 700 is provided for applying selected rules to an application request.

Block 702: A client device opens an application via interactions with the workbench UI.

Block 704: The workbench UI posts or transmits an application request to the workbench module. The application request also includes an application ID. In some cases, the application request also specifies automatically selected rules to be applied to the application request. In some cases, the automatically selected rules are specified by the workbench UI.

Block 706: The workbench module runs the plurality of selected static rules against the application request and accordingly applies rule results to the application request. The rule results are based on determining if one or more controls are satisfied when evaluating a given selected static rule against a data item of the application request.

Block 708: Similarly, the workbench module runs the plurality of selected dynamic rules against the application request and accordingly applies rule results to the application request.

Block 710: The rule results are processed by the workbench module to determine a result of the application request. In some cases, the result is a binary value, such as "success" or "failure".

Figure 8:
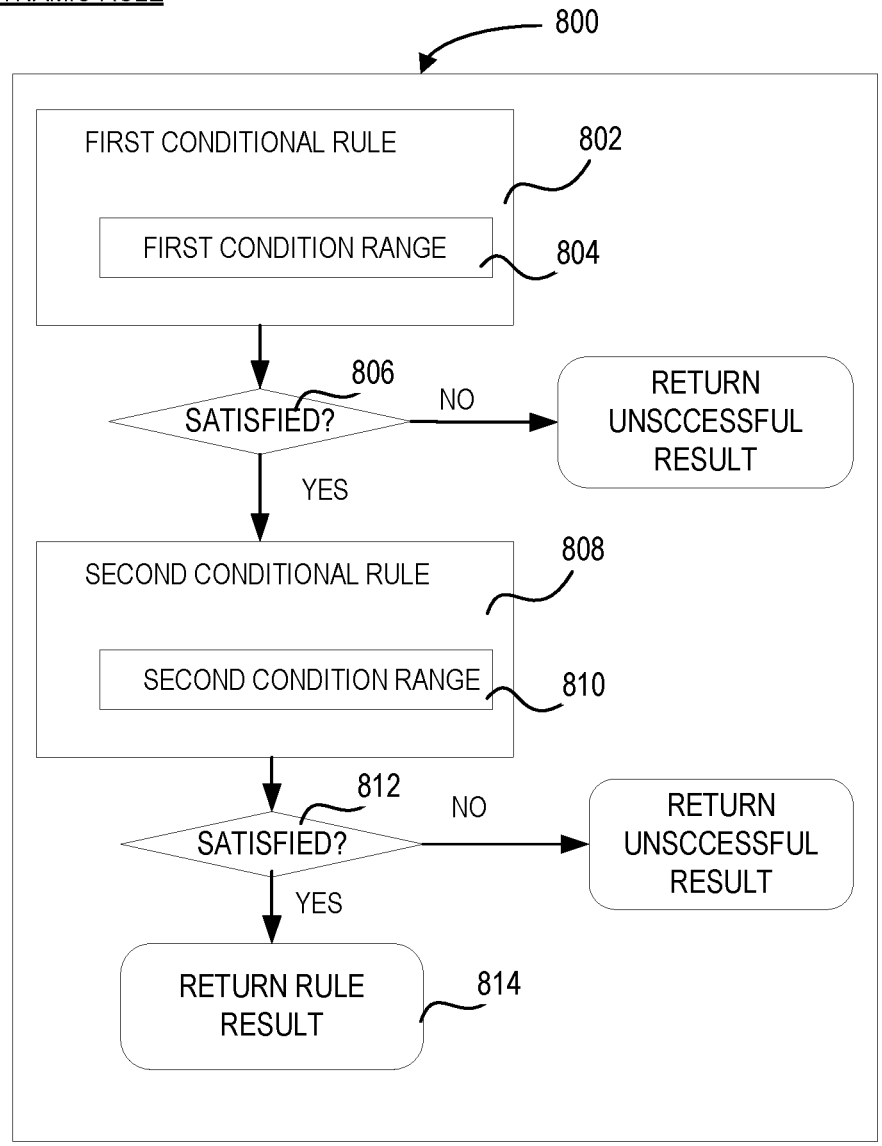
FIG. 8 is a schematic block diagram of data components of a dynamic rule in accordance with at least some embodiments.

Referring now to FIG. 8, an example embodiment is provided of a dynamic rule 800, which includes a first conditional rule 802 and a second conditional rule 808. In some cases, a first condition 804 of the first conditional rule 802 overlaps with a second condition 810 of the second conditional rule 808. The dynamic rule 800 includes logic 806, such after the workbench module evaluates the first conditional rule 802 and, based on detecting the first conditional rule 802 is satisfied, continues to evaluate the second conditional rule 808. If the second conditional rule 808 is also satisfied, the rule result is returned 814. Although two conditional rules are shown, in some other cases, there are three or more conditional rules.

In some cases, the first condition 804 is a first range of values and the second condition is a second range of values, and the first range of values at least partially overlaps the second range of values.

In some cases, the first condition 804 and the second condition 810 do not overlap. In some cases, the first range of values for a first condition ranges from R1 to R2, and the second range of values for a second condition ranges from R3 to R4, where R1, R2, R3 and R4 are numbers, and R4>R3>R2>R1.

Figure 9:
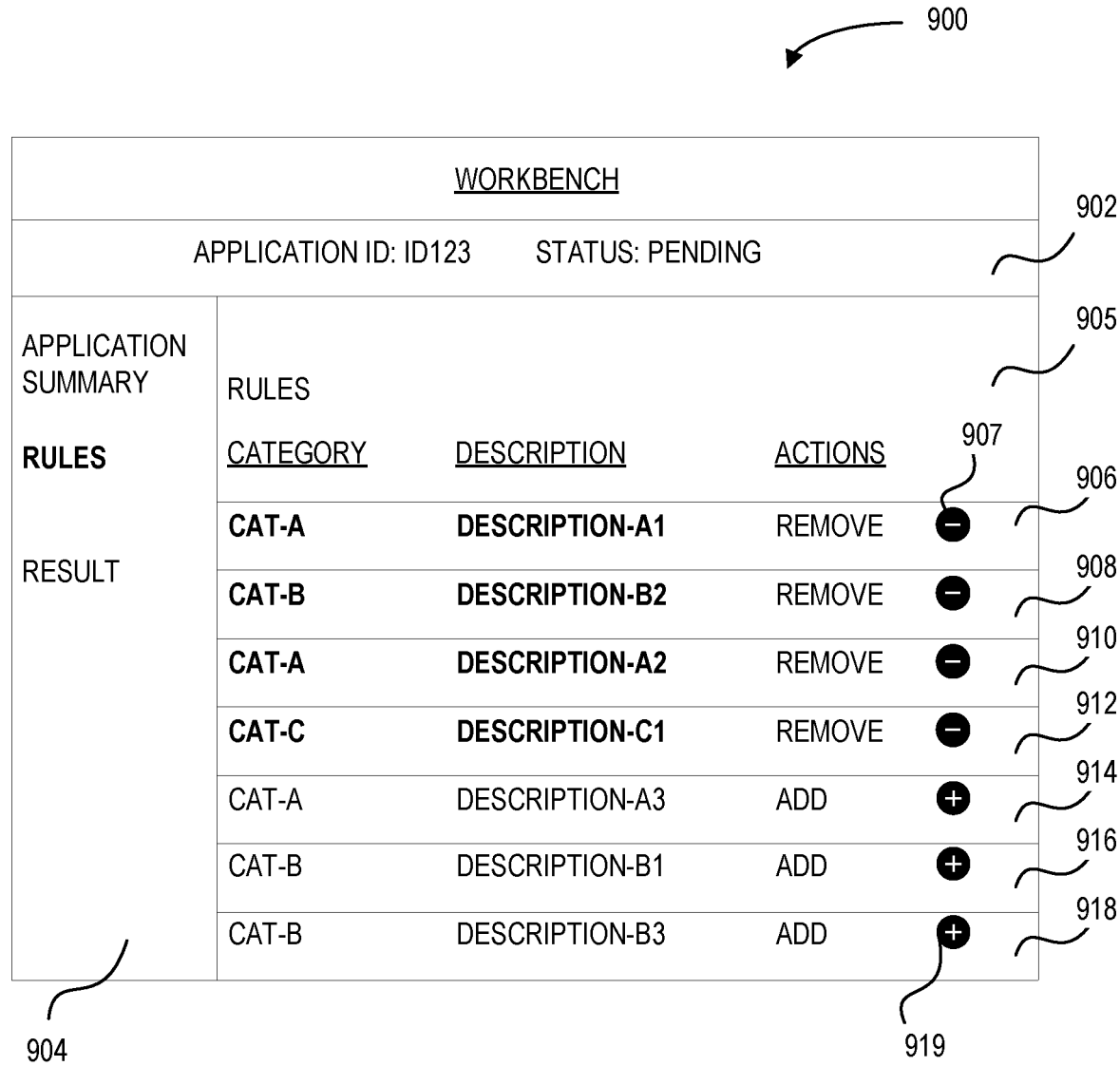
FIG. 9 is a graphical user interface of a workbench UI providing controls for selecting or deselecting one or more rules that apply to an application request in accordance with at least some embodiments.

Referring to FIG. 9, an example embodiment of a displayed workbench UI 900 is provided. The displayed workbench UI 900 is viewable, for example, in a web browser of a client device. It includes status information 902 of an application, including an application ID. A menu 904 includes a control for viewing a rules display 905, which is shown in FIG. 9. The rules display 905 lists a plurality of rules, some of which are automatically selected and some of which can be manually added. For example, rules 906, 908, 910, 912 are automatically selected and applied to the current application request. Rules 914, 916, 918 are available and are currently not applied. Controls associated with each of the rules allow a user to remove or deselect a currently selected rule, or to select a currently unselected rule. For example, by selecting a control 907 associated with the currently selected rule 906, the currently selected rule 906 will be deselected. Similarly, by selecting a control 919 associated with the currently deselected rule 918, the currently deselected rule 918 will be selected.

In this way, a user can use the displayed workbench UI 900 to control which rules are to be applied when evaluating the application request.

Figure 10:
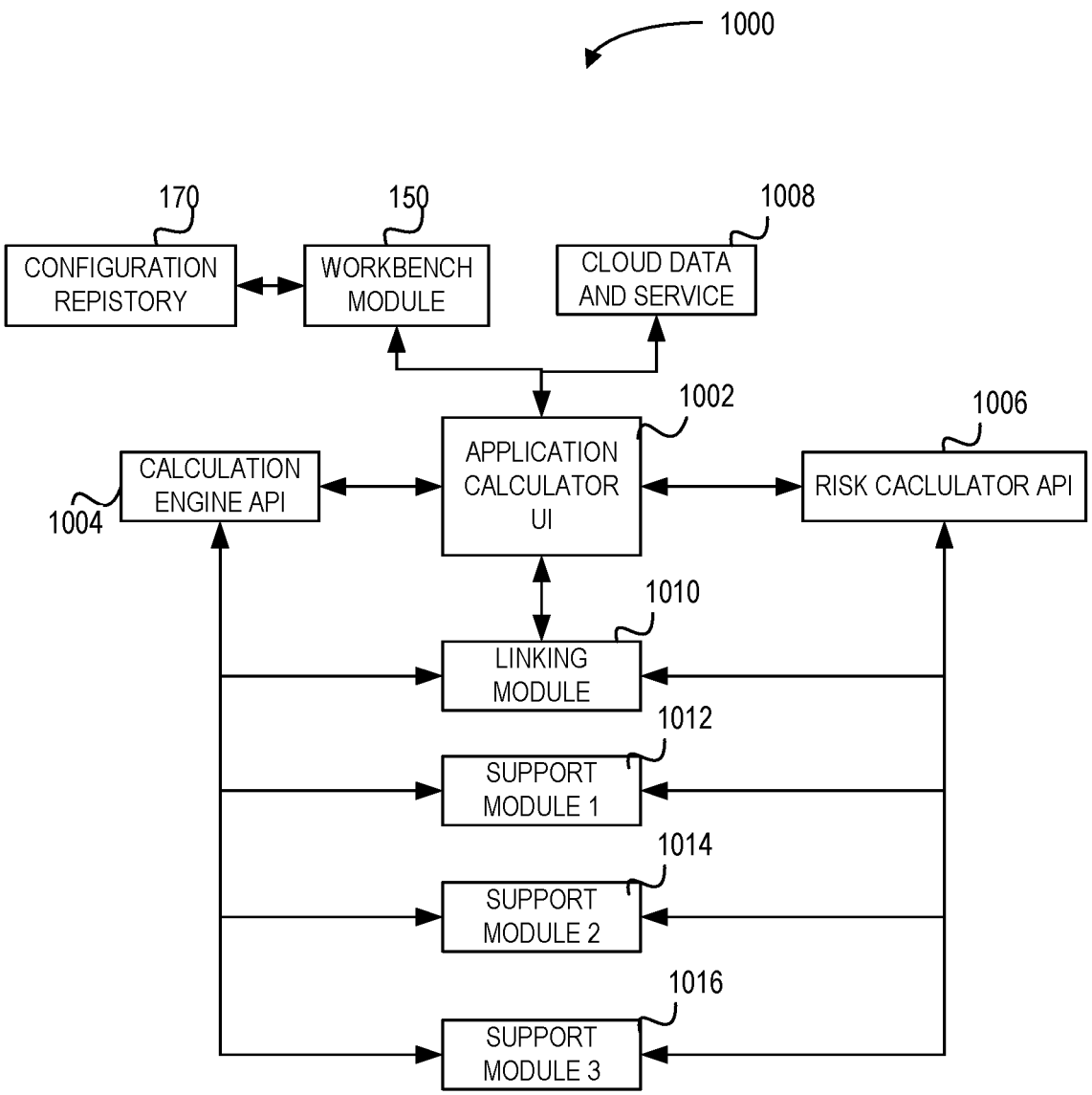
FIG. 10 is a schematic block diagram of an alternative system for processing application requests in accordance with at least some embodiments.

Referring now to FIG. 10, another system 1000 is provided that includes the workbench module 150 and the configuration repository 170. An application calculator UI 1002 is in data communication with the workbench module 150. The application calculator UI is centralized and is in data communication with a calculation engine application programming interface API 1004 and a risk calculator API 1006 to obtain calculation data and risk data associated with an application. The calculation engine API 1004 and the risk calculator API 1006 are each in data communication with a linking module 1010 and one or more support modules 1012, 1014, 1016.

The one or more support modules 1012, 1014, 1016 provide data from different data sources. In some cases, the linking module 1010 is configured to correlate, link and deduplicate data from the one or more support module 1012, 1014, 1016. In some cases, the application calculation UI and the related modules in the system 1000 help to centralize the computations, making it uniformly available to users and client systems.

In some cases, the systems and methods provided herein, including the workbench module, allow a most up-to-date version of rules to be applied for evaluating an application request without modifying code or code blocks. For example, using the workbench module can avoid modifying hard-coded rules and conditions, also called deployments. The workbench module, instead, creates and uses a configurable ruleset approach, by automatically retrieving and processing a configuration file, that facilitates frequent and automatic revision of rules and conditions. The workbench module also evaluates the most recent versions of rules to determine if they are applicable to an application request.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g., 112*a*, or 112*b*). All elements with a common base number may be referred to collectively or generically using the base number without a suffix (e.g., 112).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g., a pushbutton keyboard, mouse, a touchscreen, and the like), and at least one output device (e.g., a display screen, a printer, a wireless radio, and the like) depending on the nature of the device. Further, in some examples, one or more of the systems and methods described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

What is claimed is:

1. A system for generating automatically selected conditions, comprising:
    a memory storing instructions; and
    a first processor coupled to the memory, the first processor being configured to execute the instructions to:
    receive an application request, the application request comprising one or more fields and one or more data items corresponding respectively to each of the one or more fields;
    retrieve a configuration file from a configuration repository;
    process the configuration file to identify a plurality of rules, wherein the configuration file comprises the plurality of rules, and each one of the plurality of rules comprises a start date and an end date defining a time period of applicability for a corresponding one of the plurality of rules;
    for each selected rule of the plurality of rules applicable to selected fields of the one or more fields, evaluate the selected rules against selected data items associated with the selected fields;
    based on the evaluating, determine a result of the application request; and
    transmit the result for display.

2. The system of claim 1, wherein the plurality of rules comprises one or more static rules.

3. The system of claim 1, wherein the plurality of rules comprises one or more dynamic rules, wherein each dynamic rule comprises at least a first conditional rule and a second conditional rule, wherein a first condition of the first conditional rule overlaps with a second condition of the second conditional rule.

4. The system of claim 3, wherein the first processor is further configured to, for each dynamic rule, evaluate the first conditional rule and, based on detecting the first conditional rule is satisfied, continue to evaluate the second conditional rule.

5. The system of claim 1, wherein a plurality of previous versions of the configuration file have been retrieved periodically from the configuration repository prior to retrieving the configuration file, and wherein the configuration file is a most recent version retrieved from the configuration repository.

6. The system of claim 1, wherein the result is displayed in a web-based interface provided by the first processor.

7. The system of claim 1, further comprising a second processor operatively coupled to the first processor, wherein the second processor is configured to receive the result, and to provide a web-based interface for displaying the result.

8. The system of claim 1, wherein a first given rule of the plurality of rules comprises a first corresponding start date and a first corresponding end date defining a first time period of applicability of the first given rule, a second given rule of the plurality of rules comprises a second corresponding start date and a second corresponding end date defining a second time period of applicability of the second given rule, and the first time period of applicability is different from the second time period of applicability.

9. The system of claim 1, wherein the each one of the plurality of rules further comprises a rule name, one or more controls, and a rule result; and wherein, if the one or more controls are satisfied based on the selected fields, the rule result is processed in determining the result of the application request.

10. The system of claim 1, further comprising a prediction processor executing a machine learning model, wherein the application request originates from the prediction processor.

11. A method for generating automatically selected conditions, the method executed in a computing environment comprising one or more processors and memory, the method comprising:
    receiving an application request, the application request comprising one or more fields and one or more data items corresponding respectively to each of the one or more fields;
    retrieving a configuration file from a configuration repository;
    processing the configuration file to identify a plurality of rules, wherein the configuration file comprises the plurality of rules, and each one of the plurality of rules comprises a start date and an end date defining a time period of applicability for a corresponding one of the plurality of rules;
    for each selected rule of the plurality of rules applicable to selected fields the one or more fields, evaluating the selected rules against selected data items associated with the selected fields;
    based on the evaluating, determining a result of the application request; and
    transmitting the result for display.

12. The method of claim 11, wherein the plurality of rules comprises one or more static rules.

13. The method of claim 11, wherein the plurality of rules comprises one or more dynamic rules, wherein each dynamic rule comprises at least a first conditional rule and a second conditional rule, wherein a first condition of the first conditional rule overlaps with a second condition of the second conditional rule.

14. The method of claim 13, further comprising, for each dynamic rule, evaluating the first conditional rule and, based on detecting the first conditional rule is satisfied, continuing to evaluate the second conditional rule.

15. The method of claim 11, wherein a plurality of previous versions of the configuration file have been retrieved periodically from the configuration repository prior to retrieving the configuration file, and wherein the configuration file is a most recent version retrieved from the configuration repository.

16. The method of claim 11, wherein the method is executed using a first processor in the computing environment, the method further comprising using a second processor operatively coupled to the first processor to receive the result, and to provide a web-based interface for displaying the result.

17. The method of claim 1, wherein a first given rule of the plurality of rules comprises a first corresponding start date and a first corresponding end date defining a first time period of applicability of the first given rule, a second given rule of the plurality of rules comprises a second corresponding start date and a second corresponding end date defining a second time period of applicability of the second given rule, and the first time period of applicability is different from the second time period of applicability.

18. A non-transitory computer readable medium storing computer executable instructions which, when executed by at least one computer processor, cause the at least one computer processor to carry out a method for generating automatically selected conditions, the method comprising:
    receiving an application request, the application request comprising one or more fields and one or more data items corresponding respectively to each of the one or more fields;
    retrieving a configuration file from a configuration repository;
    processing the configuration file to identify a plurality of rules, wherein the configuration file comprises the plurality of rules, and each one of the plurality of rules comprises a start date and an end date defining a time period of applicability for a corresponding one of the plurality of rules;
    for each selected rule of the plurality of rules applicable to selected fields the one or more fields, evaluating the selected rules against selected data items associated with the selected fields;
    based on the evaluating, determining a result of the application request; and
    transmitting the result for display.

* * * * *